(12) United States Patent
Levy et al.

(10) Patent No.: US 8,870,467 B2
(45) Date of Patent: *Oct. 28, 2014

(54) OPTICAL INTERFACE AND SPLITTER WITH MICRO-LENS ARRAY

(71) Applicant: Mellanox Technologies Ltd., Yokneam (IL)

(72) Inventors: Shmuel Levy, Kyriat Tivon (IL); Shai Rephaeli, Kyriat Tivon (IL); Nimer Khazen, Ba'ne Village (IL); Yonatan Malkiman, Kfar Yehezkel (IL)

(73) Assignee: Mellanox Technologies Ltd., Yokneam (IL)

( * ) Notice: Subject to any disclaimer, the term of this patent is extended or adjusted under 35 U.S.C. 154(b) by 6 days.

This patent is subject to a terminal disclaimer.

(21) Appl. No.: 13/731,025

(22) Filed: Dec. 30, 2012

(65) Prior Publication Data

US 2013/0294725 A1 Nov. 7, 2013

Related U.S. Application Data

(63) Continuation-in-part of application No. 13/677,374, filed on Nov. 15, 2012, now Pat. No. 8,750,657, and a continuation-in-part of application No. 13/532,829, filed on Jun. 26, 2012, now Pat. No. 8,690,455.

(60) Provisional application No. 61/643,305, filed on May 6, 2012.

(51) Int. Cl.
*G02B 6/38* (2006.01)
*G02B 6/36* (2006.01)
*G02B 6/42* (2006.01)
*G02B 6/32* (2006.01)

(52) U.S. Cl.
CPC ............... *G02B 6/3829* (2013.01); *G02B 6/32* (2013.01); *G02B 6/4246* (2013.01); *G02B 6/3885* (2013.01); *G02B 6/4292* (2013.01); *G02B 6/425* (2013.01); *G02B 6/4206* (2013.01); *G02B 6/3833* (2013.01)
USPC .................................. 385/60; 385/89

(58) Field of Classification Search
USPC .................................. 385/59, 60, 89
See application file for complete search history.

(56) References Cited

U.S. PATENT DOCUMENTS 4,130,343 A 12/1978 Miller et al.
4,337,759 A 7/1982 Popovich et al.

(Continued)

OTHER PUBLICATIONS

International Electrotechnical Commision, "Fiber Optic Connector Interfaces—Part 5: Type MT Connector Family", IEC document No. IEC61754-5, second edition, 32 pages, Jul. 2005.

(Continued)

*Primary Examiner* — Omar Rojas
(74) *Attorney, Agent, or Firm* — D. Kligler I.P. Services Ltd.

(57) ABSTRACT

An apparatus includes a connector that connects to optical fibers for connecting first and second optical signals to the apparatus. A first optical ferrule is mounted perpendicularly to the connector, and transfers the first optical signals between the connector and first optical transducers mounted on a first substrate, via first holes formed in the first substrate. A second optical ferrule is mounted perpendicularly to the connector, and transfers the second optical signals between the connector and second optical transducers mounted on a second substrate, via second holes formed in the second substrate. A light rotation module bends and transfers the first and second optical signals between the connector and the first and second ferrules. One or more lenses are mounted between the first ferrule and the first holes, so as to couple the first optical signals via the first holes between the first ferrule and the first optical transducers.

25 Claims, 6 Drawing Sheets

(56) References Cited

U.S. PATENT DOCUMENTS

| | | | |
|---|---|---|---|
| 4,703,984 | A | 11/1987 | Mitchell |
| 4,979,787 | A | 12/1990 | Lichtenberger |
| 5,073,003 | A | 12/1991 | Clark |
| 5,404,869 | A | 4/1995 | Parkyn, Jr. et al. |
| 5,571,754 | A | 11/1996 | Bertin et al. |
| 5,917,976 | A | 6/1999 | Yamaguchi |
| 6,132,107 | A | 10/2000 | Morikawa |
| 6,456,766 | B1 | 9/2002 | Shaw et al. |
| 6,491,447 | B2 | 12/2002 | Aihara |
| 6,567,574 | B1 | 5/2003 | Ma et al. |
| 6,635,866 | B2 | 10/2003 | Chan et al. |
| 6,697,399 | B2 | 2/2004 | Kimura et al. |
| 6,721,187 | B2 | 4/2004 | Hall et al. |
| 6,741,777 | B2 | 5/2004 | Jewell et al. |
| 6,817,782 | B2 | 11/2004 | Togami et al. |
| 6,841,739 | B2 | 1/2005 | Moore |
| 7,040,814 | B2 | 5/2006 | Morimoto et al. |
| 7,049,704 | B2 | 5/2006 | Chakravorty et al. |
| 7,091,062 | B2 | 8/2006 | Geyer |
| 7,265,719 | B1 | 9/2007 | Moosbrugger et al. |
| 7,267,553 | B2 | 9/2007 | Sone |
| 7,289,701 | B2 | 10/2007 | Lam et al. |
| 7,350,985 | B2 * | 4/2008 | Laughlin et al. .......... 385/89 |
| 7,420,262 | B2 | 9/2008 | Bauer et al. |
| 7,515,415 | B2 | 4/2009 | Monfarad et al. |
| 7,538,358 | B2 | 5/2009 | Badehi et al. |
| 7,665,911 | B2 | 2/2010 | Hamazaki |
| 7,887,243 | B2 | 2/2011 | Abel et al. |
| 8,043,877 | B2 | 10/2011 | Badehi et al. |
| 8,115,302 | B2 | 2/2012 | Andry et al. |
| 8,144,473 | B2 | 3/2012 | Yumoto et al. |
| 8,272,788 | B2 * | 9/2012 | Ohta .......... 385/58 |
| 8,315,287 | B1 | 11/2012 | Roggero et al. |
| 8,723,332 | B2 | 5/2014 | McElrea et al. |
| 2002/0149074 | A1 | 10/2002 | Imaeda |
| 2003/0198439 | A1 | 10/2003 | Hiramatsu |
| 2004/0124523 | A1 | 7/2004 | Poo et al. |
| 2004/0184727 | A1 | 9/2004 | Liu et al. |
| 2004/0207049 | A1 | 10/2004 | Bauer et al. |
| 2006/0008214 | A1 | 1/2006 | Giboney et al. |
| 2008/0031629 | A1 | 2/2008 | Nguyen et al. |
| 2008/0128864 | A1 | 6/2008 | Cho |
| 2009/0189258 | A1 | 7/2009 | Mariani et al. |
| 2012/0051685 | A1 | 3/2012 | Su et al. |
| 2012/0224814 | A1 | 9/2012 | Hirano et al. |
| 2013/0136885 | A1 | 5/2013 | Fujii et al. |
| 2013/0156386 | A1 | 6/2013 | Miller |

OTHER PUBLICATIONS

U.S. Appl. No. 13/532,829 Office Action dated Oct. 4, 2013.
U.S. Appl. No. 13/366,326 Office Action dated Oct. 25, 2013.
U.S. Appl. No. 13/369,324 Office Action dated Nov. 4, 2013.
Levy et al., U.S Appl. No. 13/366,326, filed Feb. 5, 2012.
Levy et al., U.S. Appl. No. 13/419,447, filed Mar. 14, 2012.
Levy et al., U.S. Appl. No. 13/419,449, filed Mar. 14, 2012.
Levy, S., U.S. Appl. No. 13/481,874, filed May 28, 2012.
Levy et al., U.S. Appl. No. 13/369,324, filed Feb. 9, 2012.
Connected Fibers, LLC., "Mt Ferrules", Datasheet, Jan. 2009.
Lee et al., "Silicon Optical Bench for Transmitter Module", Department of Optics and Photonics, National Central University, Taiwan, Oct. 19, 2009.
"Glass and Silicon Packages Webinar", Georgia Institute of Technology, 3D-Systems Packaging Research Center, Atlanta, USA, Jul. 21, 2010.
Micralyne, Inc., "MEMS Optical Components", Apr. 5, 2012.
Eldada et al., "Advances in Polymer Integrated Optics", IEEE Journal of Selected Topics in Quantum Electronics, vol. 5, No. 1, pp. 54-68, Jan./Feb. 2000.
U.S. Appl. No. 13/677,374, filed Nov. 15, 2012.
U.S. Appl. No. 13/851,178, filed Mar. 27, 2012.
Stockham et al., "Assembly of micro-optical systems with mechanical positioning", Proceedings of the SPIE, Optomechatronic Micro/Nano Devices and Components II, 637609, Oct. 13, 2006.
Levy et al., U.S. Appl. No. 13/532,829, filed Jun. 26, 2012.
U.S. Appl. No. 13/366,326 Office Action dated Mar. 27, 2014.
U.S. Appl. No. 13/677,374 Office Action dated Jan. 30, 2014.
U.S. Appl. No. 13/851,178 Office Action dated Aug. 29, 2014.

* cited by examiner

OPTICAL INTERFACE AND SPLITTER WITH MICRO-LENS ARRAY

CROSS-REFERENCE TO RELATED APPLICATIONS

This application is a continuation-in-part of U.S. patent application Ser. No. 13/677,374, filed Nov. 15, 2012. This application is also a continuation-in-part of U.S. patent application Ser. No. 13/532,829, filed Jun. 26, 2012, which claims the benefit of U.S. Provisional Patent Application 61/643,305, filed May 6, 2012. The disclosures of all these related applications are incorporated herein by reference.

FIELD OF THE INVENTION

The present invention relates generally to optical communication devices, and particularly to optical interface modules.

BACKGROUND OF THE INVENTION

Optical interface modules are used in communication equipment for converting optical signals into electrical signals and vice versa. Some optical interface modules comprise components such as Photo-Detectors (PDs) and Trans-Impedance Amplifiers (TIAs) for optical reception, drivers and Vertical Cavity Surface-Emitting Lasers (VCSELs) for optical transmission, high-speed electrical connectors, as well as light coupling optics for coupling light to and from optical fibers that are connected to the optical interface module.

SUMMARY OF THE INVENTION

An embodiment of the present invention that is described herein provides an apparatus including an optical connector, first and second optical ferrules, a light rotation module and one or more lenses. The optical connector is configured to connect to external optical fibers for connecting first and second optical signals to the apparatus. The first optical ferrule is mounted perpendicularly to the optical I/O connector, and is configured to transfer the first optical signals between the optical I/O connector and respective first optical transducers that are mounted on a first substrate, via first holes formed in the first substrate. The second optical ferrule is mounted perpendicularly to the optical I/O connector, and is configured to transfer the second optical signals between the optical I/O connector and respective second optical transducers that are mounted on a second substrate, via second holes formed in the second substrate. The light rotation module is configured to bend and transfer the first and second optical signals between the optical I/O connector and the perpendicularly-mounted first and second optical ferrules. The lenses are mounted between the first ferrule and the first holes, so as to couple the first optical signals via the first holes between the first ferrule and the first optical transducers.

In some embodiments, the light rotation module includes first optical fibers for transferring the first optical signals and second optical fibers for transferring the second optical signals. In an embodiment, the first optical fibers are fitted in the first ferrule such that respective ends of the first optical fibers are flush with an edge of the first ferrule adjacent to the lenses.

In some embodiments, the first optical transducers are mounted on the first substrate using a flip-chip process. In another embodiment, the first and second ferrules are mounted in a plane, and the optical Input/Output (I/O) connector is tilted relative to the plane. In an embodiment, the first and second substrates comprise an optically opaque material.

In a disclosed embodiment, the one or more lenses are configured to compensate for a divergence of the first optical signals traversing the first holes. In an embodiment, an optical characteristic of the one or more lenses is defined depending on a thickness of the first substrate. In some embodiments, the one or more lenses are fabricated in a micro-lens array.

There is additionally provided, in accordance with an embodiment of the present invention, a method for producing an optical interface module. The method includes mounting an optical connector for connecting to external optical fibers that connect first and second optical signals to the optical interface module. A first optical ferrule is mounted perpendicularly to the optical I/O connector, for transferring the first optical signals between the optical I/O connector and respective first optical transducers that are mounted on a first substrate, via first holes formed in the first substrate. A second optical ferrule is mounted perpendicularly to the optical I/O connector, for transferring the second optical signals between the optical I/O connector and respective second optical transducers that are mounted on a second substrate, via second holes formed in the second substrate. The optical I/O connector is connected to the first and second optical ferrules by a light rotation module, which bends and transfers the first and second optical signals between the optical I/O connector and the perpendicularly-mounted first and second optical ferrules. One or more lenses are mounted between the first ferrule and the first holes, so as to couple the first optical signals via the first holes between the first ferrule and the first optical transducers.

There is also provided, in accordance with an embodiment of the present invention, a method for communication, including transferring first and second optical signals carried on external optical fibers using an optical connector. The first optical signals are transferred between the optical I/O connector and respective first optical transducers mounted on a first substrate, via first holes formed in the first substrate, using a first optical ferrule mounted perpendicularly to the optical I/O connector. The second optical signals are transferred between the optical I/O connector and respective second optical transducers mounted on a second substrate, via second holes formed in the second substrate, using a second optical ferrule mounted perpendicularly to the optical I/O connector. The first and second optical signals are bent and transferred between the optical I/O connector and the perpendicularly-mounted first and second optical ferrules, using a light rotation module. The first optical signals are coupled via the first holes between the first ferrule and the first optical transducers using one or more lenses that are mounted between the first ferrule and the first holes.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow provide improved optical interface module configurations. The disclosed modules exchange signals between optical fibers at one end and electronic equipment at the other end. Modules of this sort can be used, for example, for interconnection between network switches, servers and storage devices. The disclosed modules are typically designed for mounting on a main Printed Circuit Board (PCB) of the electronic equipment.

In some embodiments, an optical interface module comprises an optical Input/Output (I/O) connector for receiving optical input signals and for transmitting optical output signals. The connector may comprise, for example, an MT-24 female ferrule connector for coupling to an optical fiber cable with a male MT-24 connector.

The optical interface module comprises two optical ferrules. One ferrule transfers the optical input signals from the I/O connector to an array of optical detectors for conversion into electrical signals. The other ferrule transfers the optical output signals from an array of optical emitters to the I/O connector for transmission.

In some embodiments, the I/O connector and the two ferrules are all arranged in a flat, planar configuration, i.e., in the same plane. The I/O connector comprises two rows of optical terminals, positioned one above the other parallel with the plane. The ferrules are placed in this plane back-to-back, and perpendicularly to the I/O connector. In alternative embodiments, the central axis of the I/O connector is mounted in the plane, and the connector comprises two columns of optical terminals, positioned one beside the other perpendicularly to the plane. In other embodiments, the two ferrules are arranged in a flat planar configuration, but the I/O connector may be oriented at predetermined tilt angle relative to the flat planar configuration of the ferrules.

A light rotation module bends and transfers the input and output optical signals between the optical I/O connector and the perpendicularly-mounted optical ferrules. In some embodiments, the light rotation module comprises Bend-Insensitive (BI) optical fibers that are bent at a right angle and carry the optical signals between the I/O connector and the ferrules. In other embodiments, the light rotation module comprises an array of mirrors that rotate the optical signals at a right angle so as to direct them between the I/O connector and the ferrules.

In some embodiments, the optical detectors (e.g., Photo-Detectors—PDs) and the optical emitters (e.g., Vertical Cavity Surface-Emitting Lasers—VCSELs) are mounted on opposite parallel faces of a U-shaped PCB. Trans-Impedance Amplifiers (TIAs) for amplifying the PD outputs are mounted on the U-shaped PCB adjacent to the PDs, and drivers for driving the VCSELs are mounted on the U-shaped PCB adjacent to the VCSELs. Conductive traces connect the PDs and VCSELs via the TIAs and drivers to electrical interconnections on the third, bottom face of the U-shaped PCB. This third face is used for electrically interconnecting with the electronic equipment.

The disclosed optical interface modules can be used for transmitting and receiving various kinds of optical signals, such as Fourteen Data Rate (FDR) at 14 Gbps and Enhanced Data Rate (EDR) at 25 Gbps. In some embodiments, for example in some EDR implementations, an array of lenses is coupled to the first ferrule in order to focus the light carrying the input optical signals onto the respective optical detectors. The optical interface modules described herein enable high-speed interconnection between electronic equipment, with an extremely small form factor and low power consumption. In an example embodiment, a module that supports twelve input signals and twelve output signals is 12.5 mm high and occupies a PCB area of 400 mm$^2$. High bandwidth is ensured by placing the drivers and TIAs immediately adjacent to the VCSELs and PDs, respectively.

In some embodiments disclosed herein, the ends of the optical fibers of the light rotation module are flush with the ferrule edge so as to prevent mechanical damage to the fiber ends during assembly. An array of micro-lenses is placed between the ferrule edge and the optical transducers (e.g., PD and VCSEL arrays) in order to couple the light between the fiber ends and the respective optical transducers mounted on the opposite surface the PCB substrate. In this configuration, the light between the optical transducers and the respective fiber ends traverses suitable openings in the PCB. The lenses help in collimating or focusing the light that traverses the openings. With this configuration, the fiber ends are not required to protrude beyond the edge of the ferrule, and therefore the reliability and manufacturing yield during the assembly of the optical modules are significantly improved.

Optical Interface Module Description

Figure 1:
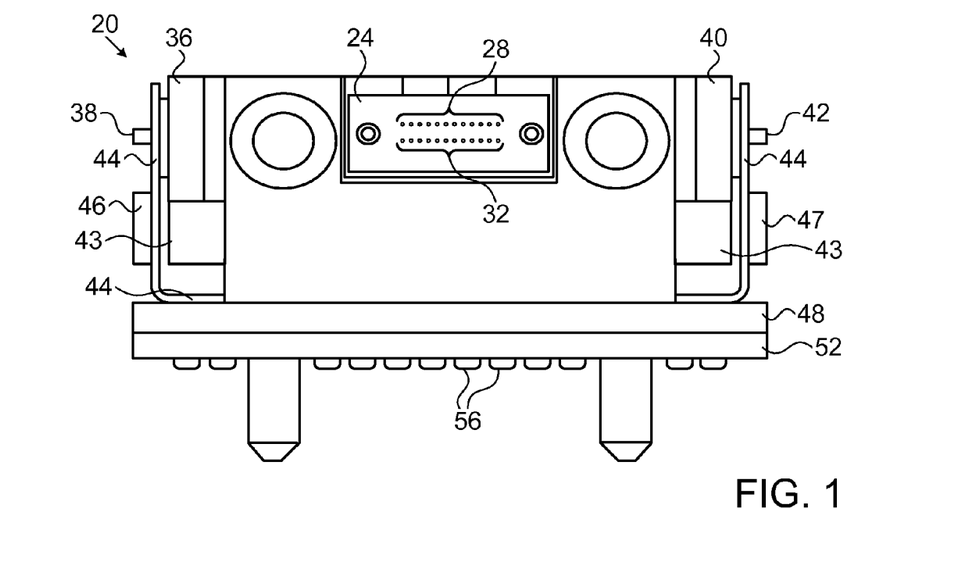
FIG. 1 is a diagram showing a front view of an optical interface module, in accordance with an embodiment of the present invention.
Figure 2:
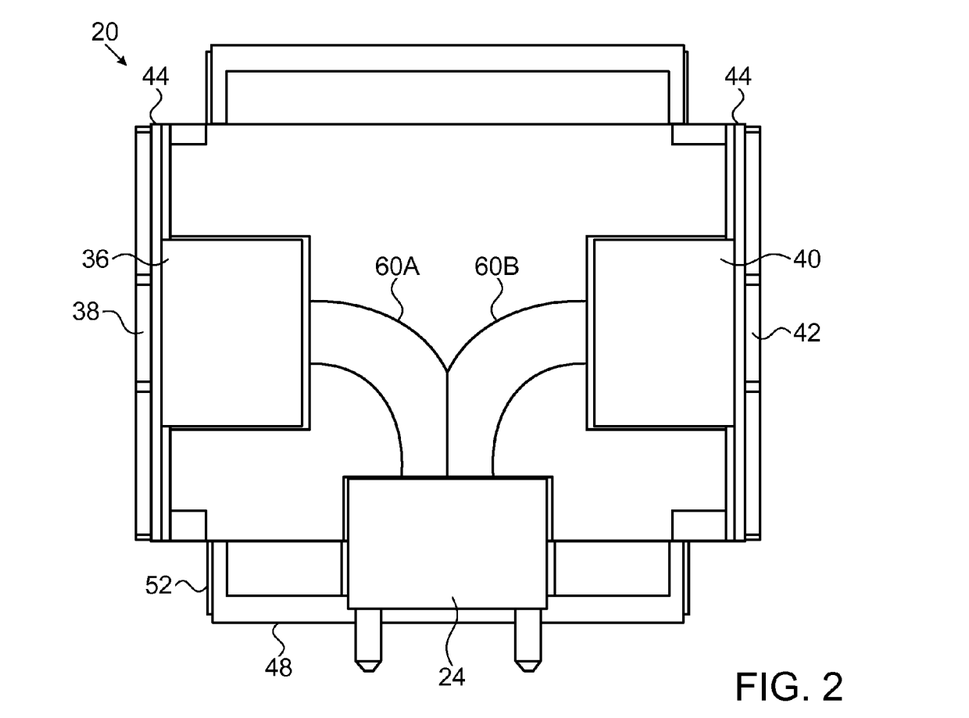
FIG. 2 is a diagram showing a top view of an optical interface module, in accordance with an embodiment of the present invention.

FIG. 1 is a diagram showing a front view of an optical interface module 20, in accordance with an embodiment of the present invention. A top view of module is shown in FIG. 2 below. Module 20 is typically mounted on a main PCB of some electronic equipment, such as a network switch, and used for connecting the switch to other equipment via an optical fiber cable. In the present example, the area of module 20 is 24×16.5 mm, and the module height is 12.5 mm. In alternative embodiments, however, any other suitable dimensions can be used.

Module 20 comprises an optical I/O connector 24, for receiving one or more optical input signals into module and for transmitting one or more optical output signals out of module 20. In the present example, connector 24 comprises a Multi-Termination-24 (MT-24) facet female ferrule. This type of connector comprises two rows of twelve optical terminals each, for connecting to respective optical fibers. In the present example, a top row 28 of terminals is used for transmitting twelve optical output signals and a bottom row 32 is used for receiving twelve optical input signals. In alternative embodiments, however, the optical I/O connector may have any other suitable shape and may support any other suitable number of optical input and output signals.

Module 20 comprises two optical ferrules, typically made of a suitable plastic material. A ferrule 36 is used for coupling an array of VCSELs 38 to respective optical fibers. These fibers carry the optical output signals from VCSELs 38 to row 28 of connector 24. Another ferrule 40 is used for coupling an array of PDs 42 to respective optical fibers. These fibers carry the optical input signals from row 32 of connector 24 to PDs 42. The two ferrules are sometimes referred to as a left-side micro-hole (LSµH) array ferrule and a right-side micro-hole (RSµH) array ferrule. Each ferrule comprises an array of twelve micro-holes for coupling twelve fibers to the respective VCSELs or PDs.

A support beam 43 provides mechanical support for connector 24, ferrules 36 and 40, and the interconnections between them (shown in FIG. 2 below).

Module 20 comprises a U-shaped Printed Circuit Board (PCB) 44. The U-shaped PCB may be produced, for example, from a single flexible PCB that is bent into shape, or from three rigid PCBs that are connected to one another. VCSELs 38 and PDs 42 are mounted on opposite parallel faces of PCB 44. An array of drivers 46 is mounted on PCB adjacent to VCSELs 38. Each driver 46 drives a respective VCSEL 38 with a respective electrical signal, so as to cause the VCSEL to produce an optical output signal. An array of Trans-Impedance Amplifiers (TIAs) 47 is mounted on PCB 44 adjacent to PDs 42. Each TIA 47 amplifies the electrical signal that is produced by a respective PD 42 in response to a respective optical input signal.

The third (bottom) face of U-shaped PCB 44 is attached to a rigid substrate 48, which is in turn attached to a socket 52. Socket 52 comprises multiple electrical interconnections 56, e.g., ball bumps or pins, for connecting to the main PCB of the electronic equipment (not shown in the figure).

FIG. 2 is a diagram showing a top view of optical interface module 20, in accordance with an embodiment of the present invention. In addition to the above-described elements, the top view shows two sets of Bend-Insensitive (BI) optical fibers that are used for transferring the optical signals between optical I/O connector 24 and ferrules 36 and 40.

A set 60A of BI fibers is bent at a right angle so as to transfer the optical output signals produced by VCSELs 38 from ferrule 36 to connector 24. A set 60B of BI fibers is bent at a right angle so as to transfer the optical input signals from connector 24 to ferrule 40, en-route to PDs 42.

As can be seen in FIGS. 1 and 2, all the optical processing in module 20 is performed in a single plane. I/O connector 24, ferrules 36 and 40, VCSELs 38 and PDs 42 are all arranged in a planar configuration in a single plane. The central axis of I/O connector 24, which is parallel to the connector's optical terminals, is located in the plane. The optical terminals are arranged in two rows that are positioned one above the other parallel to the plane. This planar configuration enables module 20 to have a flat shape and a small form factor. In this single plane, ferrules 36 and 40 are positioned back-to-back, and both ferrules are perpendicular to the I/O connector.

Figure 6:
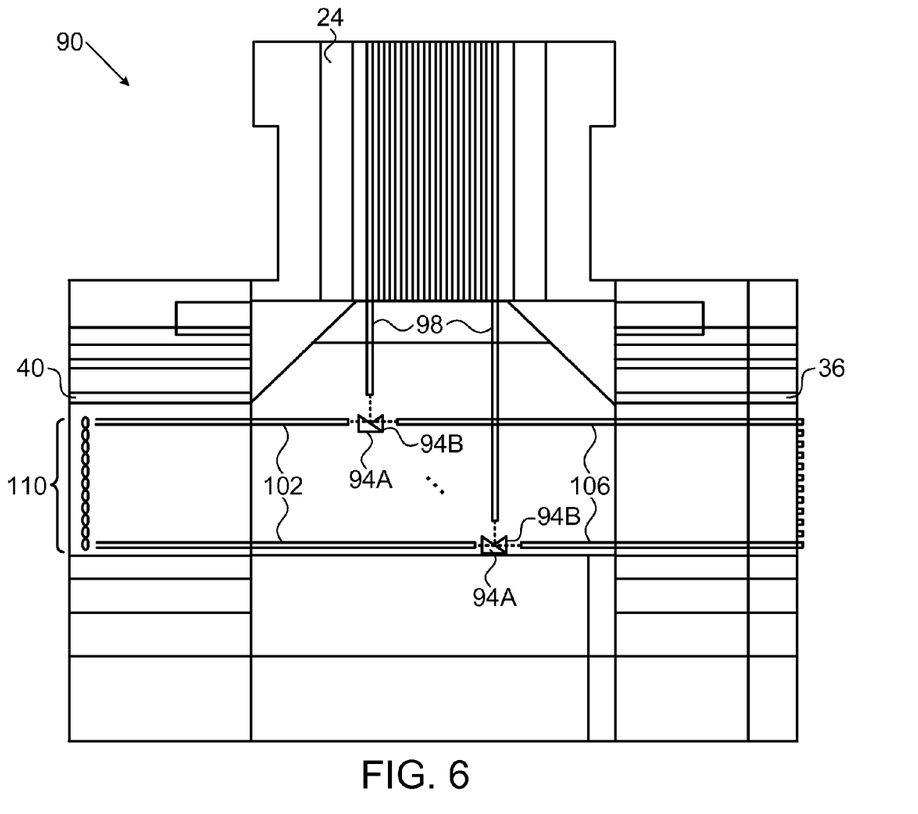
FIG. 6 is a diagram that schematically illustrates a top view of an optical interface module, in accordance with an alternative embodiment of the present invention.

Thus, each fiber set 60A and 60B bends the optical signals at a right angle in order to transfer the optical signals between I/O connector 24 and the respective ferrule. Fiber sets 60A and 60B are one possible implementation of a light rotation module that performs these functions. An alternative implementation using an array of mirrors is shown in FIG. 6 further below. Further alternatively, the light rotation module may be implemented in any other suitable way, for example using prisms.

Figure 3:
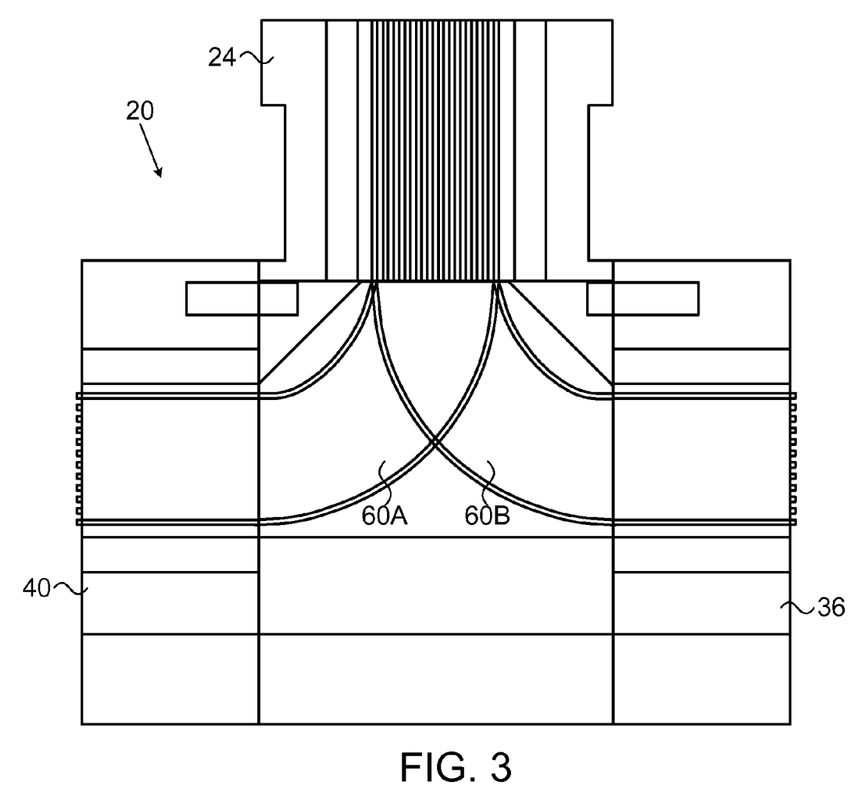
FIG. 3 is a diagram that schematically illustrates a top view of an optical interface module, in accordance with an embodiment of the present invention.

FIG. 3 is a diagram that schematically illustrates a top view of optical interface module 20, in accordance with an embodiment of the present invention. In the present example, the radius of curvature of the BI fibers is 2.5 mm, although any other suitable radius can be used. The fibers may comprise, for example, 50 µm fibers, 125 µm fibers, or any other suitable type of optical fibers.

In the examples of FIGS. 1-3, fiber sets 60A and 60B are coupled to the respective VCSELs and PDs using direct air-gap, butt fiber coupling. This type of coupling is typically used in FDR applications. In alternative embodiments, for example in EDR applications, coupling between fiber set 60B and PDs 42 uses an array of micro-lenses. This sort of configuration is shown in FIG. 6 further below.

Figure 4:
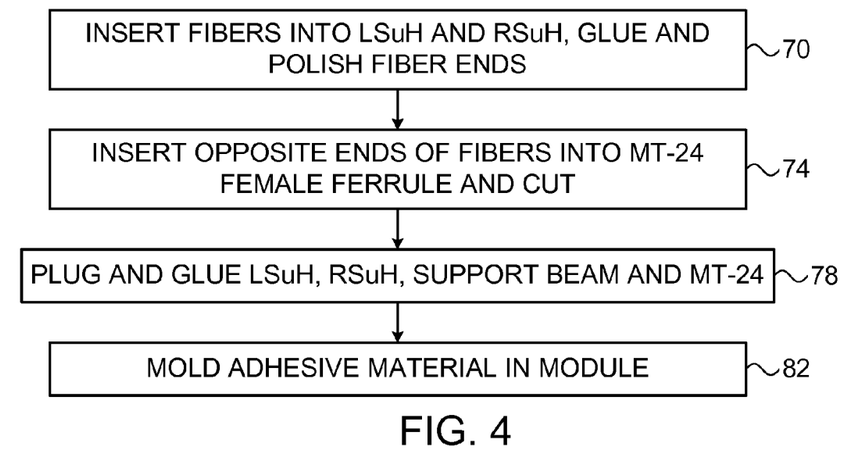
FIG. 4 is a flow chart that schematically illustrates a method for assembling an optical interface module, in accordance with an embodiment of the present invention.

FIG. 4 is a flow chart that schematically illustrates a method for assembling optical interface module 20, in accordance with an embodiment of the present invention. The assembly process of FIG. 4 refers to an FDR implementation using BI fibers. Variations to the process for other implementations are addressed further below.

The method begins by inserting the fibers of sets 60A and 60B into ferrules 36 and 40, respectively, at a ferrule assembly step 70. Twelve fibers are inserted into the micro-holes of each ferrule, until the fibers protrude from the opposite end of the ferrule. The fibers are glued in place, and the protruded ends of the fibers are polished so as to conically shape each fiber end. The far ends of the fibers are left as pigtails.

The far ends of the fibers in sets 60A and 60B (twenty-four in total) are inserted into the appropriate terminals of MT-24 connector 24, at a connector assembly step 74. The fiber ends are cut to the MT-24 facet size.

Connector 24, ferrules 36 and 40, and support beam 43 are fitted and glued together, at an assembly step 78. In some embodiments, the various elements comprise pins and corresponding holes or recesses for this purpose. A soft adhesive material is molded in the opening at the center of the resulting module, at a molding step 82.

Following this assembly process, the remaining elements of module 20, e.g., U-shaped PCB 44 and the components mounted on it, are attached to the ferrules.

In an alternative embodiment, ferrule 40 comprises an internal array of twelve micro-lenses that are fitted against the respective micro-holes. Each lens focuses the light coming out of the respective fiber onto the surface of the respective PD. This implementation, which is shown in FIG. 6 below, is used, for example, in applications where the diameter of the active area of PD 42 is too small for direct coupling between the fiber and the PD. In some EDR applications, for example, the PD active area diameter is smaller than 50 µm, and lenses are thus used for coupling.

When using the array of micro-lenses, the assembly process of FIG. 4 may change: Twelve cleaved fibers are inserted into each ferrule. In ferrule 40, each fiber is inserted until reaching a built-in stopper located before the respective micro-lens facet. The remaining assembly steps proceed according to FIG. 4.

Figure 5A:
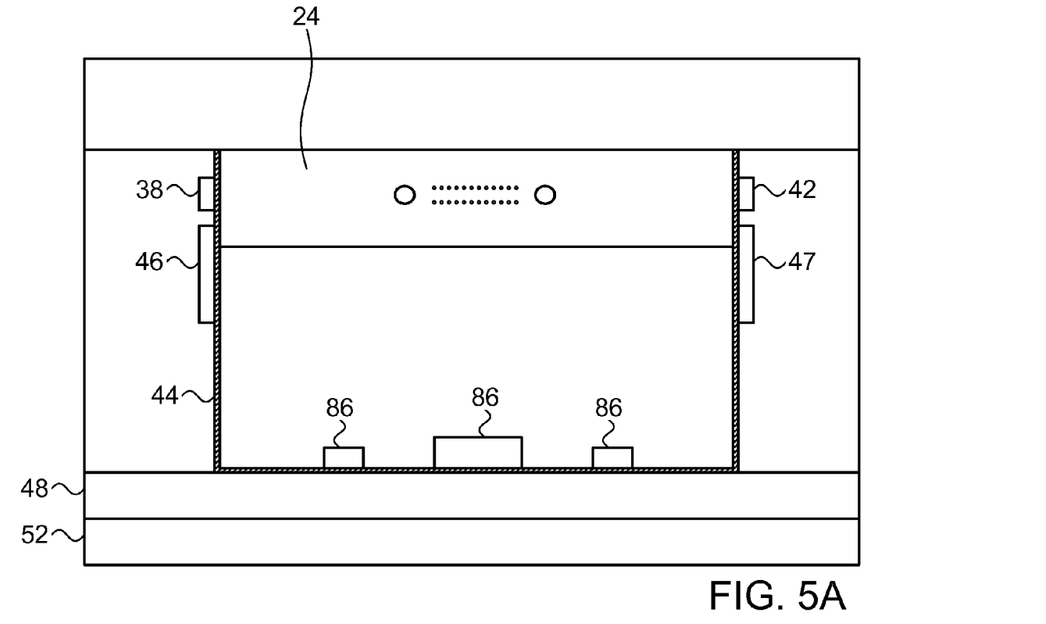
FIGS. 5A and 5B are diagrams that schematically illustrate respective front and top views of an optical interface module, in accordance with an embodiment of the present invention.
Figure 5B:
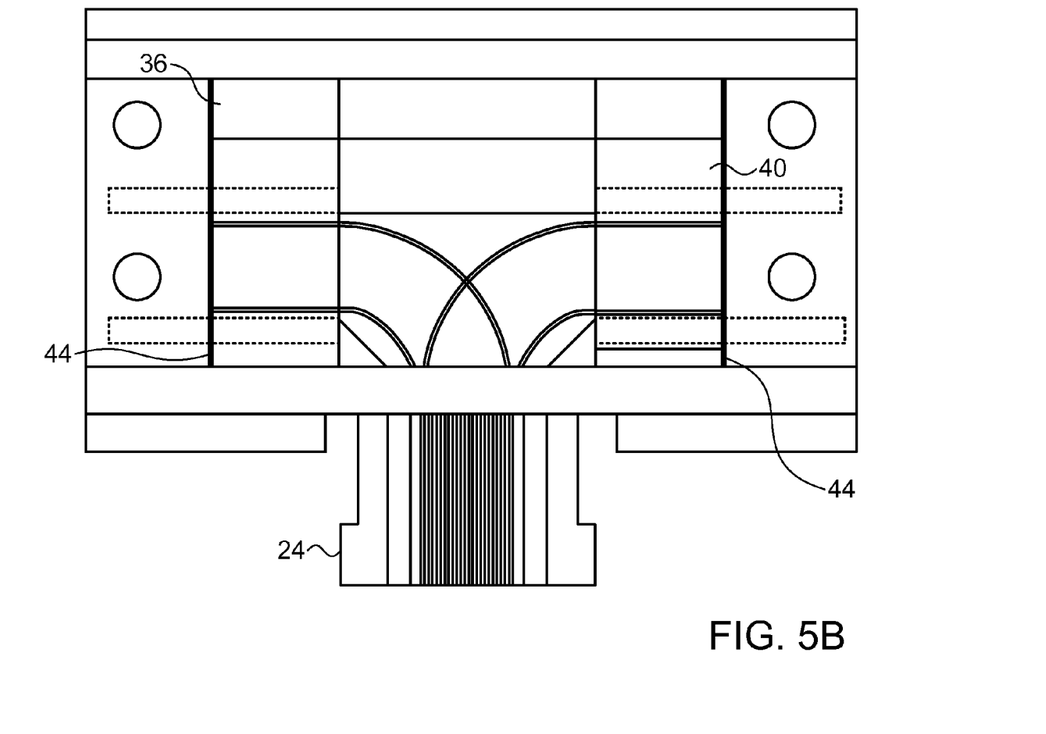

FIGS. 5A and 5B are diagrams that schematically illustrate respective front and top views of optical interface module 20, in accordance with an embodiment of the present invention. These figure show additional elements that may be comprised in the module. In this example, an optical heat block is attached to each of the parallel faces of U-shaped PCB 44. A heat sink is placed on top of the module, above the plane of the ferrules and connector. The heat blocks and heat sink are used for dissipating the heat generated in the module. Additional electronic components 86, such as a microcontroller, may be mounted on the third, bottom face of U-shaped PCB 44.

Alternative Implementation Using Mirror Array

FIG. 6 is a diagram that schematically illustrates a top view of an optical interface module 90, in accordance with an alternative embodiment of the present invention. In this example, the light that carries the optical signals between connector 24 and ferrules 36 and 40 is bent at right angles using an array of micro-mirrors. In this array, twelve mirrors 94A direct the light from VCSELs 38 to connector 24, and twelve mirrors 94B direct the light from connector 24 to PDs 42.

In an embodiment, optical fibers 98 guide the light between connector 24 and the micro-mirror array, optical fibers 102 guide the light between mirrors 94B and ferrule 40, and optical fibers 106 guide the light between mirrors 94A and ferrule 36.

In the implementation of FIG. 6, a micro-lens array 110 in ferrule 40 focuses the light guided by fibers 102 onto the corresponding PDs 42 (not shown in this figure), as explained above.

Figure 7:
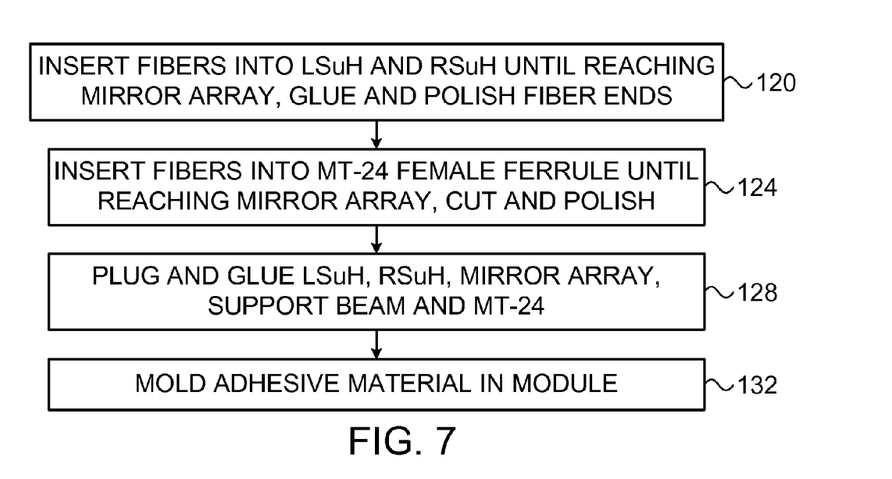
FIG. 7 is a flow chart that schematically illustrates a method for assembling an optical interface module, in accordance with an embodiment of the present invention.

FIG. 7 is a flow chart that schematically illustrates a method for assembling optical interface module 90, in accordance with an embodiment of the present invention. The assembly process begins by inserting twelve fibers 102 and twelve fibers 106 into ferrules 40 and 36, respectively, at a first insertion step 120.

Each fiber is typically inserted until it reaches a built-in stopper located before the respective mirror. At the other end, the fibers are inserted until they protrude from the ferrule, and then glued and polished so as to conically shape each fiber end.

At a second insertion step, twenty-four fibers 98 are inserted into MT-24 connector 24 until each fiber reaches a built-in stopper located before the respective mirror in the mirror array. On the connector side, the fibers are cut and polished to the MT-24 facet plane. At a module assembly step 128, ferrules 36 and 40, support beam 43 and connector 24 are fitted together, e.g., using matching pins and holes, and then glued. Soft adhesive material is molded into the opening at the center of the module, at a potting step 132.

The assembly process of FIG. 7 refers to an FDR module, in which no lens array is used in ferrule 40. For EDR, the process may change: Twelve cleaved fibers are inserted into each ferrule. In ferrule 40, each fiber 102 is inserted until reaching a built-in stopper located before the respective micro-lens facet. The remaining assembly steps proceed according to FIG. 7.

The examples above refer to specific combinations of direct air-gap fiber-end coupling, micro-lens array coupling, light bending using BI fibers and light bending using micro-mirrors. In alternative embodiments, the optical interface module may comprise any other suitable combination of these elements.

The optical interface module configurations described herein are example configurations, which are chosen purely for the sake of conceptual clarity. In alternative embodiments, any other suitable module configuration may be used.

Alternative Implementation Using Rotated I/O Connector

In the embodiments described above, I/O connector 24 is mounted parallel with the plane of module 20, such that the optical terminals of the I/O connector are arranged in two rows that are positioned one above the other parallel with the plane.

In an alternative embodiment, I/O connector 24 is mounted such that the central axis of the connector is in the plane, but the optical terminals are arranged in two columns that are positioned one beside the other perpendicularly to the plane.

In other words, the I/O connector in this alternative embodiment is rotated at 90 degrees relative to its orientation in FIG. 1 above. In a front view similar to that of FIG. 1, the I/O connector in the alternative embodiment would appear vertical, with two columns 28 and 32 of optical terminals arranged vertically one next to the other. In a top view similar to that of FIG. 2 above, the two guide pins of the I/O connector would overlap. In this embodiment, the other elements of the optical module, e.g., the light rotation module and the two ferrules, are modified accordingly to bend the light between the optical terminals of connector 24 and the corresponding PDs and VCSELs.

Alternative Implementation Using Integrated Micro-Lens Arrays

In some of the optical module configurations described previously, the ends of the fibers in the two ferrules are typically cut or cleaved, and polished, to create smooth fiber facets which are butt-coupled directly to the optical transducers. In order to enable this direct coupling, the fibers are inserted in micro-holes formed through the body of the ferrule.

VCSEL array 38 and PD array 42 are typically flip-chip mounted on one surface of PCB 44 substrate. In this mounting configuration, however, the optical transducer active area (and thus the direction of light emission or detection) points toward the surface of PCB 44. Therefore the transducers are mounted against respective through holes that are formed through the cross-section of PCB 44. Typically, the fiber ends extend past the edge of the ferrule and are placed in the through-holes formed in PCB 44 in order to mechanically support the fiber edges which are butt-coupled to the individual optical transducer devices mounted on the opposite surface of the PCB.

In practice, however, the optical modules using a fiber facet butt-coupling configuration results in a lower manufacturing yield with less performance reliability. The exposed fiber ends extending past the ferrule edge are prone to mechanical damage such as chipping or cracking of the fiber facets during the module assembly process.

Moreover, if the length of the fiber extending from the ferrule edge to the fiber facet is not precisely controlled, the facet can possibly damage the optical transducers and/or the fiber ends when inserted into the PCB through holes during assembly. An alternative implementation described below helps to improve performance reliability and manufacturing yield of the optical modules and to avoid the potential damage to the fibers and transducers.

Figure 8:
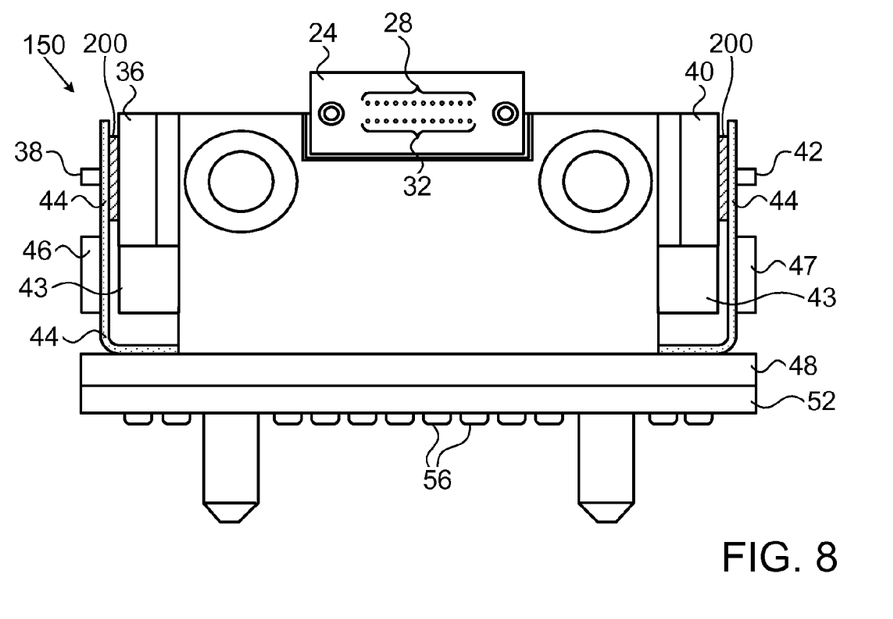
FIG. 8 is a diagram showing a front view of an optical interface module with an integrated micro-lens array, in accordance with an embodiment of the present invention.

FIG. 8 is a diagram showing a front view of an optical interface module 150 that comprises an integrated micro-lens array 200, in accordance with an embodiment of the present invention. The different elements of optical module 150 are identical to module 20 shown in FIG. 1 and FIG. 2 as previously described with the following modifications. First, the optical processing in module 150 is not necessarily all performed in a single plane as in module 20. Here, optical I/O connector 24 is mounted at a predetermined tilt angle relative to the module assembly, to allow for a more versatile mechanical integration of module 150 into any suitable optical system assembly.

Secondly, to overcome the reliability and yield problems caused by the fiber ends protruding past the ferrule edge, the fiber facets in the embodiment of FIG. 8 are positioned to be flush with the edge of the ferrule. In such a configuration where the fiber facets are separated from the optical transducer array and the fiber facets are no longer butt-coupled to the individual optical transducer devices, light rays exiting the fiber facets diverge through holes formed in PCB 44 en-route to the optical transducer, resulting in a severe degradation in optical coupling efficiency. In an example embodiment, PCB 44 has a thickness of 100 µm (and thus the length of the through-holes are 100 µm), although any other suitable thickness can be used.

To improve the coupling efficiency, one or more micro-lenses, which are typically arranged in micro-lens array 200 assembly, are mounted between the edge of the ferrule and a first surface of PCB 44. The micro-lenses compensate for this divergence by directing and collimating the light rays of the optical signals between the fiber facets (now flush with the edge of the ferrule) and the optical transducers an the opposite surface of PCB 44 via the holes. Certain aspects of this configuration are addressed in U.S. patent application Ser. No. 13/677,374, filed Nov. 15, 2012, which is assigned to the assignee of the present patent application and whose disclosure is incorporated herein by reference.

Figure 9:
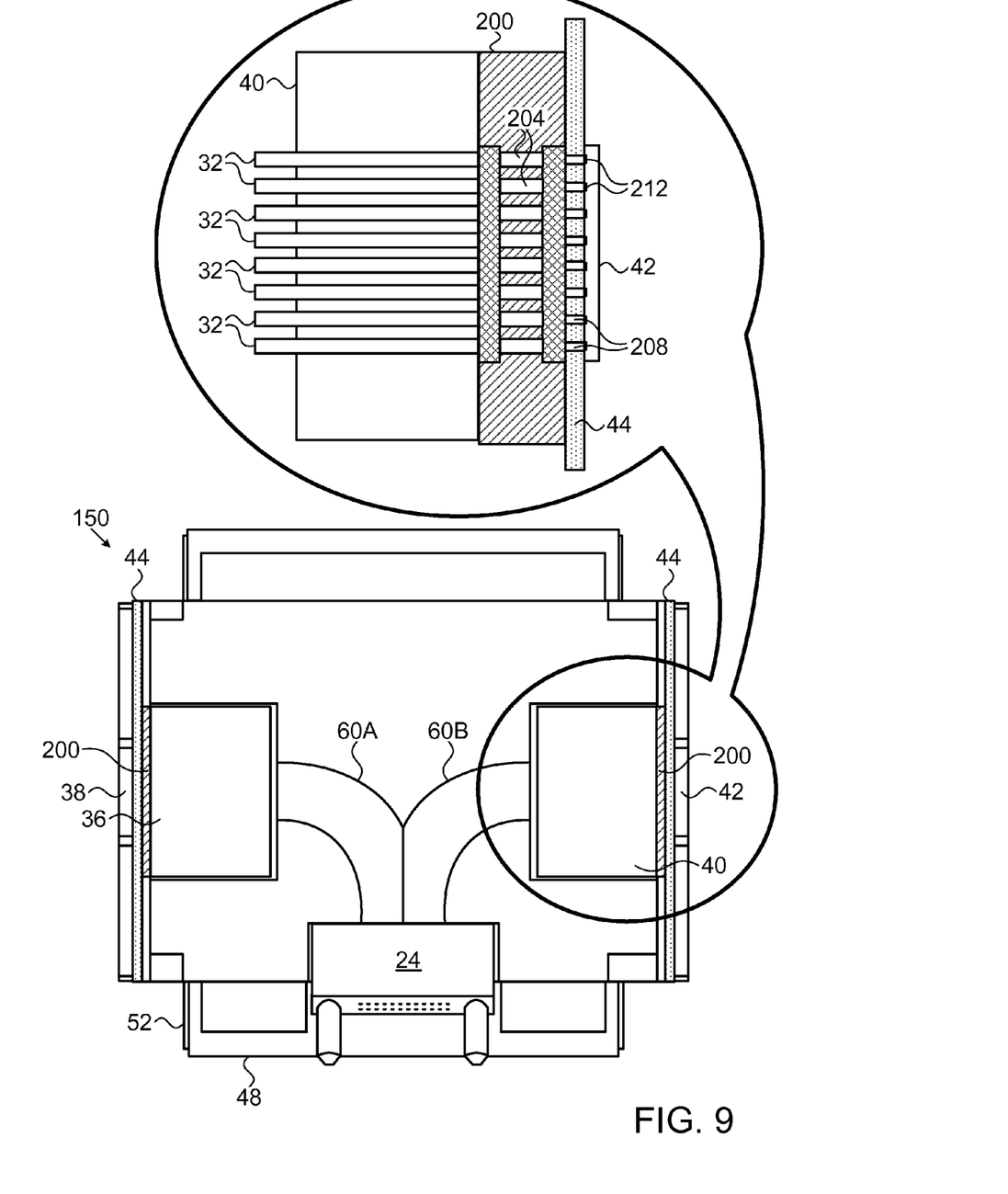
FIG. 9 is a diagram showing a top view of an optical interface module with an integrated micro-lens array, in accordance with an embodiment of the present invention.

FIG. 9 is a diagram showing a top view of optical interface module 150 with integrated micro-lens array 200, in accordance with an embodiment of the present invention. Ferrule 36 is used for coupling VCSEL devices arranged in VCSEL array 38 to respective optical fibers. Ferrule 40 is used for coupling photodiode devices arranged in PD array 42 to respective optical fibers. VCSEL array 38 and PD array 42 are mounted on PCB 44.

The inset of FIG. 9 shows an enlargement of the optical interface with micro-lens array 200 in accordance with an embodiment of the present invention, which is an enlarged view of the optical receive side of the module. The transmit side (around ferrule 38) has a similar structure.

Fibers 32 carrying the input optical signals are mounted in micro-holes formed in ferrule 40. The fiber facets are flush with the (right) edge of the ferrule 40 as shown in the inset of FIG. 9, and direct the light to integrated micro-lens assembly 200 comprising individual micro-lenses 204. Micro-lenses 204 focus and couple the input optical signals in fibers 32 via respective through-holes 208 formed in PCB 44 to respective individual photodiode devices 212 arranged in an array (e.g., PD array 42).

The same micro-lens array configuration is also applied to the fibers carrying the output optical signals from VCSEL array 38, which are mounted through micro-holes formed in ferrule 36 (e.g., the optical transmitter side of module 150). In alternative embodiments, however, the micro-lens array configuration may be used only with ferrule 40 (receive side) or only with ferrule 36 (transmit side).

The use of micro-lens array 200 simplifies and reduces the cost of the assembly process of module 150. In the present example embodiment, the ends of fibers 32 are flush with the edge of ferrule 40. This configuration protects the fiber edge facets from damage during production and assembly, which would otherwise reduce yield and reliability if the facets protrude from the ferrule as described previously. The optical characteristics of the one or more lenses in micro-lens array 200 with micro-lenses 204 (e.g., focal length, working distance, spot size) are typically designed depending on the layout and mechanical tolerances of the module elements (e.g., depending on the length of PCB holes 208, which is the thickness of PCB 44).

The configuration of module 150 shown in FIGS. 8 and 9 is an example configuration, which is chosen purely for sake of clarity. In alternative embodiments, any other suitable optical module configuration may be used. For example, module 150 may comprise any suitable number of optical transducers of any suitable type, which may be arranged mechanically in any other suitable arrangement. Micro-lens array 200 may be fabricated from any suitable material, such as glass or plastic.

In alternative embodiments, the micro-lens array configuration of FIGS. 8 and 9 can be used with other types of light rotation modules, such as with the mirror-based light rotation module of FIG. 6 above.

Alternatively to PCB 44, the substrate on which the optical transducers are mounted may comprise any other suitable material and shape. In some embodiments, the substrate material is optically opaque, such that optical signals traversing adjacent holes 208 formed in the substrate will not interfere with one another.

In alternative embodiments, connector 24 may be mounted in the same plane as the two ferrules, similarly to the planar configuration of FIGS. 1 and 2. In alternative embodiments, instead of using a single U-shaped PCB, the PDs and VCSELs may be mounted on separate, respective PCBs or other substrates.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
   a U-shaped printed circuit board (PCB);
   first optical transducers mounted on a first substrate of the U-shaped PCB;
   second optical transducers mounted on a second substrate of the U-shaped PCB;
   an optical I/O connector, which is configured to connect to external optical fibers for connecting first and second optical signals to the apparatus;
   a first optical ferrule, which is optically coupled to the first optical transducers, via first holes formed in the first substrate;
   a second optical ferrule, which is optically coupled to the second optical transducers, via second holes formed in the second substrate;
   a light rotation module, which is configured to bend and transfer the first and second optical signals between the optical I/O connector and the first and second optical ferrules; and
   one or more lenses, which are mounted between the first ferrule and the first holes, so as to couple the first optical signals via the first holes between the first ferrule and the first optical transducers.

2. The apparatus according to claim 1, wherein the light rotation module comprises first optical fibers for transferring the first optical signals and second optical fibers for transferring the second optical signals.

3. The apparatus according to claim 2, wherein the first optical fibers are fitted in the first ferrule such that respective ends of the first optical fibers are flush with an edge of the first ferrule adjacent to the lenses.

4. The apparatus according to claim 1, wherein the first optical transducers are mounted on the first substrate using a flip-chip process.

5. The apparatus according to claim 1, wherein the first and second ferrules are mounted in a plane, and wherein the optical Input/Output (I/O) connector is tilted relative to the plane.

6. The apparatus according to claim 1, wherein the first and second substrates comprise an optically opaque material.

7. The apparatus according to claim 1, wherein the one or more lenses are configured to compensate for a divergence of the first optical signals traversing the first holes.

8. The apparatus according to claim 1, wherein an optical characteristic of the one or more lenses is defined depending on a thickness of the first substrate.

9. The apparatus according to claim 1, wherein the one or more lenses are fabricated in a micro-lens array.

10. A method for producing an optical interface module, the method comprising:
   providing a U-shaped printed circuit board (PCB);
   mounting first optical transducers on a first substrate of the U-shaped PCB;
   mounting second optical transducers on a second substrate of the U-shaped PCB;
   providing an optical I/O connector for connecting to external optical fibers that connect first and second optical signals to the optical interface module;
   mounting a first optical ferrule to be optically coupled to the first optical transducers, via first holes formed in the first substrate;
   mounting a second optical ferrule to be optically coupled to the second optical transducers, via second holes formed in the second substrate;
   connecting the optical I/O connector to the first and second optical ferrules by a light rotation module, which bends and transfers the first and second optical signals between the optical I/O connector and the first and second optical ferrules; and
   mounting one or more lenses between the first ferrule and the first holes, so as to couple the first optical signals via the first holes between the first ferrule and the first optical transducers.

11. The method according to claim 10, wherein connecting the I/O connector to the ferrules comprises producing the light rotation module using first optical fibers for transferring the first optical signals and second optical fibers for transferring the second optical signals.

12. The method according to claim 11, wherein producing the light rotation module comprises fitting the first optical fibers in the first ferrule such that respective ends of the first optical fibers are flush with an edge of the first ferrule adjacent to the lenses.

13. The method according to claim 10, and comprising mounting the first optical transducers on the first substrate using a flip-chip process.

14. The method according to claim 10, wherein mounting the ferrules comprises positioning the first and second ferrules in a plane, and wherein mounting the optical Input/Output (I/O) connector comprises tilting the I/O connector relative to the plane.

15. The method according to claim 10, wherein the first and second substrates comprise an optically opaque material.

16. The method according to claim 10, wherein the one or more lenses compensate for a divergence of the first optical signals traversing the first holes.

17. The method according to claim 10, wherein an optical characteristic of the one or more lenses is defined depending on a thickness of the first substrate.

18. The method according to claim 10, wherein the one or more lenses are fabricated in a micro-lens array.

19. A method for communication, comprising:
   transferring first and second optical signals carried on external optical fibers using an optical connector;
   transferring the first optical signals between the optical I/O connector and respective first optical transducers mounted on a first substrate, via first holes formed in the first substrate, using a first optical ferrule mounted on a U-shaped printed circuit board (PCB) including the first substrate;
   transferring the second optical signals between the optical I/O connector and respective second optical transducers mounted on a second substrate included in the U-shaped PCB, via second holes formed in the second substrate, using a second optical ferrule mounted on the U-shaped PCB;
   bending and transferring the first and second optical signals between the optical I/O connector and the first and second optical ferrules, using a light rotation module; and
   coupling the first optical signals via the first holes between the first ferrule and the first optical transducers using one or more lenses that are mounted between the first ferrule and the first holes.

20. The apparatus according to claim 1, wherein the first and second substrates are parallel to each other.

21. The apparatus according to claim 1, wherein the first and second substrates are perpendicular to the optical I/O connector.

22. The apparatus according to claim 1, wherein the I/O connector and the two ferrules are all arranged in a flat, planar configuration.

23. The apparatus according to claim 1, wherein the first optical transducers comprise optical detectors and the second optical transducers comprise optical emitters.

24. The apparatus according to claim 1, wherein the first and second optical transducers are mounted on opposite faces of the U-shaped PCB.

25. The apparatus according to claim 1, wherein the first and second ferrules are positioned back-to-back.

* * * * *